United States Patent [19]

Hohmann et al.

[11] 4,046,752

[45] Sept. 6, 1977

[54] PROCESS FOR PREPARING AN AZO COMPOUND FROM A 2-AMINOTHIAZOLE DIAZO COMPONENT

[75] Inventors: Kurt Hohmann, Neu-Isenburg; Reinhard Mohr, Offenbach, Main; Manfred Hahnke, Kelkheim, Taunus, all of Germany

[73] Assignee: Hoechst Aktiengesellschaft, Frankfurt am Main, Germany

[21] Appl. No.: 594,111

[22] Filed: July 8, 1975

[30] Foreign Application Priority Data

July 11, 1974 Germany .......................... 2433229

[51] Int. Cl.$^2$ ............................................. C09B 29/36
[52] U.S. Cl. ................................. 260/158; 260/146 R; 260/146 D; 260/154; 260/155; 260/156
[58] Field of Search ................... 260/146 R, 158, 154, 260/155, 156, 146 D, 157

[56] References Cited

U.S. PATENT DOCUMENTS

| 2,864,812 | 12/1958 | Bossard et al. | 260/158 X |
| 3,770,719 | 11/1973 | Fisher et al. | 260/158 |
| 3,816,391 | 6/1974 | Coates et al. | 260/158 |

Primary Examiner—Charles F. Warren
Attorney, Agent, or Firm—Connolly and Hutz

[57] ABSTRACT

A process for the direct preparation of pure thiazolazo compounds had been found with the use of a 2-aminothiazole as diazo or azo component in a coupling process wherein the 2-aminothiazole used therein is subjected to the usual coupling reaction, if used as diazo-component after diazotation, without intermediate isolation after its preparation in known manner. This process avoids the preparation of the 2-aminothiazoles as starting compounds in its solid form and the expensive purification of these instable compounds and yields now very pure azo products.

3 Claims, No Drawings

PROCESS FOR PREPARING AN AZO COMPOUND FROM A 2-AMINOTHIAZOLE DIAZO COMPONENT

The present invention relates to an improved process for preparing thiazolazo compounds.

Thiazolazo compounds from 2-aminothiazoles are used to a large extent as disperse and cationic dyestuffs as well as pharmaceutical products.

The preparation of these compounds is effected in the way that 2-aminothiazoles are diazotized, coupled with suitable coupling components and the dyestuffs obtained are quaternized, if desired, or that 2-aminothiazoles are used as coupling components.

The 2-aminothiazoles or the salts thereof as starting compounds are used in the solid form. However, 2-aminothiazole has toxical properties (cf. F.A. Patty, Industrial Hygiene and Toxicology, Vol.II Toxicology, 1963, page 2179-80) and Ullmanns Encyklopadie der technischen Chemie (1966), volume 17, page 333); furthermore it is relatively instable and difficult to be purified (cf. Ullmanns Encyclopadie der technischen Chemie (1953), volume 3, page 522), so that the preparation of such dyestuffs implies a considerable expenditure in technical equipment.

It has now been found that these disadvantages can be avoided and the preparation of thiazolazo compounds while using 2-aminothiazoles as diazo or coupling components can be carried out in a more simple and less dangerous way when the 2-aminothiazoles synthetized in known manner is directly used in the diazotation process, if used as diazo component, and in the coupling process without intermediate isolation, from its preparation reaction mixture, and optionally the azo compound obtained is subsequently quaternized by alkylation, if desired to prepare the quaternary azo dyestuff.

The process is carried out by preparing according to one of the known processes (cf. Ullmanns Encyklopadie der technischen Chemie (1953), volume 3, page 522, and Elderfield, Heterocyclic Compounds, volume 5, page 484 ff (1957) the 2-aminothiazol, for example by reacting thio-urea with carbonyl halides according to the scheme $$R_1-CO-CH-Hal + H_2NCSNH_2$$
$$\qquad\quad\; |$$
$$\qquad\quad\; R_2$$

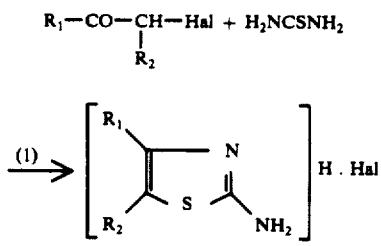

wherein $R_1$ is hydrogen, an alkyl radical having 1 to 5 carbon atoms, an aralkyl, for example benzyl radical, aryl, for example phenyl or naphthyl radical, trifluoromethyl, cyano, carboxylic acid, carboxylic acid ester, for example -benzyl or alkyl ester having 1 to 5 carbon atoms in the alkyl radical, carboxylic acid amide, carboxylic acid hydrazide, carbalkoxyalkyl radical, for example with an alkyl radical having 1 to 5 carbon atoms, carbamoylalkyl, for example with an alkyl radical having 1 to 5 carbon atoms, or a heterocyclic radical and $R_2$ is hydrogen, hydroxyalkyl, for example with an alkyl radical having 1 to 5 carbon atoms, an alkyl radical having 1 to 5 carbon atoms, an aryl, for example phenyl or naphthyl radical, carboxylic acid, carboxylic acid ester, for example benzyl or alkyl ester having 1 to 5 carbon atoms in the alkyl radical, carboxylic acid amide, alkylsulfone, for example with an alkyl radical having 1 to 5 carbon atoms, or arylsulfonic radical, for example phenylsulfonyl radical, whereby the carboxylic acid or sulfonic acid amide groups may contain substituents, and by using the aqueous acid solution thus obtained of the 2-aminothiazol directly for the further reaction.

The reaction of the thiourea with the carbonyl halide, expediently the chloride or bromide according to the equation (1) may be carried out in a suitable solvent.

Suitable solvents are for example water, mineral acids, such as hydrochloric acid, sulfuric acid or phosphoric acids, lower aliphatic carboxylic acids, as for example acetic acid, propionic acid or lactic acid, lower aliphatic alcohols, such as methanol, ethanol, n- or isopropanol or butanol, dimethylformamide, dimethylacetamide or dioxane or mixtures of the solvents mentioned. Especially suitable is acetic acid or a mixture of acetic acid and propionic acid, whereby water and/or a mineral acid may be present.

The acid solution thus obtained of the 2-aminothiazol may directly be further used. Thus diazotation may subsequently be carried out according to usual methods, for example with alkali nitrite and an inorganic acid, for example hydrochloric acid, sulfuric acid or phosphoric acid, or with nitrosylsulfuric acid.

Coupling with the coupling components may also be effected in known manner, for example in a neutral to acidic medium, if desired in the presence of sodium acetate or similar buffer substances or catalysts influencing the coupling speed, as for example dimethylformamide, pyridine or the salts thereof.

As coupling components there are considered aromatic or heterocyclic compounds generally free from sulfonic acid groups which couple in o- or p-position with regard to a hydroxy group or a primary, secondary or tertiary amino group.

From the series of the suitable components coupling in an o- or p-position with regard to a hydroxy group, are aromatic or heterocyclic hydroxy compounds as well as compounds containing a ketomethylene group enolized or capable of being enolized which are in a heterocyclic ring. Such compounds are for example phenol, the derivatives of the phenol substituted in 2- or 4-position such as o- and p-cresol, p-chlorophenol, 4-hydroxy-1,2-xylene, 4-hydroxy-acetophenone and hydrochinone-monomethyl ether, the derivatives of the 1-naphthol substituted in 4-position such as 4-chloro-1-naphthol, 4-methoxy-1-naphthol and 4-benzoyl-1-naphthol, 2-naphthol and the derivatives thereof such as 6-bromo-2-naphthol, 2-hydroxy-7-methoxynaphthalene, 1-benzoylamino-7-naphthol and 4-benzolazo-1-amino-7-naphthol, as well as 6-hydroxy-indazol, 6-hydroxychinoline, 8-hydroxychinoline, 4-hydroxy-1-alkyl-2-chinolines, 6-hydroxy-2-pyridones, 3-hydroxydiphenylamine, 2-hydroxycarbazol, 5-hydroxybenzothiazol, 3-hydroxy-diphenylene oxide and 5- pyrazolones. Besides these monohydroxy compounds there are considered as coupling components polyhydroxy compounds of the aromatic or heterocyclic series coupling in o-position to the hydroxy groups, for example resorcine, benzoyl resorcine, terephthaloylbisresorcine, 2,6-dihydroxy-naphthalene, 2,4-dihydroxy-chinoline and 3,6-dihydroxy-diphenylene oxide. There are furthermore suitable alkyl or aryl amides of aromatic or heterocyclic hydroxy-carboxylic acids or of acylacetic acids, for example alkyl or aryl amides of 2,3-hydroxynaphthoic acids, 2-hydroxycarbazol-3-carboxylic acids, 3-hydroxydiphenylene-oxide-2-carboxylic acids, of the acetacetic acid or the benzoylacetic acid.

Among the coupling components used according to the process which couple in o- or p-position to a primary, secondary or tertiary amino group there may especially be mentioned aromatic or heterocyclic amino compounds: As primary amines for example aniline, toluidine, xylidenes, anisidines, phenylene diamines, tolylene diamines, aminocresol ethers, alkoxyanilines, chloroanilines, 3-acylamino-anilines, dialkoxy-anilines and naphthylamines as well as heterocyclic amines as for example aminopyrimidines, 5-aminopyrazoles, 6- or 7-aminoindazoles or aminochinolines; as secondary or tertiary amines compounds of the benzene or naphthalene series, whereby the benzene or naphthalene radical may contain as further substituents for example halogen atoms, alkyl, alkoxy, carbalkoxy, carboxy, alkylsulfonyl, carbamoyl, sulfamoyl, amino, trifluoromethyl, acyl- or acylamino groups. For the secondary or tertiary amino group there are important as substituents for example lower alkyl radicals having 1 to 5 carbon atoms or aralkyl, cycloalkyl or aryl radicals, in which, if desired, further substituents may be contained, for example halogen atoms, hydroxy, cyano, acyloxy, carbalkoxy, carbamoyl, dialkylamino, phenyl, alkoxy, acyl, pyridyl, dicarboximido, alkylsulfonyl, arylsulfonyl, alkylsulfonylamino, sulfamoyl or phenoxy groups. In the tertiary amines the alkyl groups may form with one another or together with a nitrogen or oxygen atom hydrogenated hetero rings such as the piperidine, morpholine or piperazine ring.

As coupling components there are furthermore suitable indoles, for example indole, 2-alkylindoles, 1-arylindoles, 1,2-dialkylindoles, 1-alkyl-2-arylindoles or 1-alkylindoles and the derivatives thereof substituted in the benzene nucleus; these indoles may contain non-ionic substituents in the alkyl or aryl radicals. Suitable coupling components are furthermore 1,2,3,4-tetrahydrochlinolines or 1,2,3,4-tetrahydrobenzochinolines, which contain at the nitrogen atom optionally substituted alkyl radicals, as well as benzomorpolines, benzopiperazines, 2-methylene-1,3,3-trialkyl-indolines, 2-cyanomethylene-1,3-dialkylbenzimidazolines, 1-alkyl-, 2-alkyl- or 1,2-dialkyl-perimidines, 4,5-dialkyl- or 4,5-diarylimidazoles, arylpyrazolines, for example 1,5-diphenyl-3,5-dimethyl-pyrazoline-Δ2,1-(α-naphthyl)-3,5,5-trimethylpyrazoline-Δ2, 1-phenyl-3,5,5-trimethylpyrazoline-Δ2 or 1-(2'-methoxy-5'-methylphenyl)-3,5,5-trimethyl-pyrazoline-Δ2, 1,3-indandione, 2,6-dihydroxy-3-cyano-4-alkyl-pyridines, 2,6-diamino-3-cyano-4-alkylpyridines, 2,6-bisalkylamino-4-phenylamino-pyrimidines, or 2,4-bisalkylamino-6-phenylamino-pyrimidines, whereby the alkyl radicals preferably contain 1 to 5 carbon atoms.

If desired, the coupling components may contain hydrosolubilizing groups such as sulfonic acid groups or sulfato groups.

If the 2-aminothiazoles in 5-position are unsubstituted, they may also be used as coupling components and converted into the azo compounds with diazotized aromatic or heterocyclic amines.

The alkylation of the azo compounds, if applied, is carried out at elevated temperature, with or without addition of acid-binding agents such as magnesium oxide, magnesium carbonate, sodium carbonate, calcium carbonate or sodium bicarbonate and optionally under pressure. The conditions favorable in each case may be easily determined by a prelimiary test.

The alkylation may be carried out in water.

As alkylating agents there are considered alkyl halides, aralkyl halides, halogenoacetamides, β-halogenopropionitriles, halogeno-hydrines, alkylene oxides, acrylic acid amides, alkyl esters of the sulfuric acid or alkyl esters of organic sulfonic acids.

Suitable alkylating agents are for example methyl chloride, bromide or iodide, ethyl bromide or iodide, propyl bromide or iodide, benzyl chloride, chloroacetamide, β-chloro-propionitrile, ethylene chlorohydrine, dimethylsulfate, benzene-sulfonic acid methyl ester, p-toluene-sulfonic acid methyl-, ethyl-, propyl- or butyl ester. The alkylation is preferably carried out in an inert organic solvent, for examples in a hydrocarbon, chlorohydrocarbon or nitrohydrocarbon, as for example benzene, toluene, xylene, tetrachloroethane, chloroform, carbon tetrachloride, mono- or dichlorobenzene or nitrobenzene, in an acid amide or acid anhydride, such as dimethylformamide, N-methylacetamide or acetic acid anhydride, in dimethylsulfoxide or in a ketone, such as acetone or methylethyl keton. Instead or an organic solvent an excess of the alkylation agent may also be used.

According to the process of the invention thiazolazo or thiazoliumazo compounds of the following formulae A to C

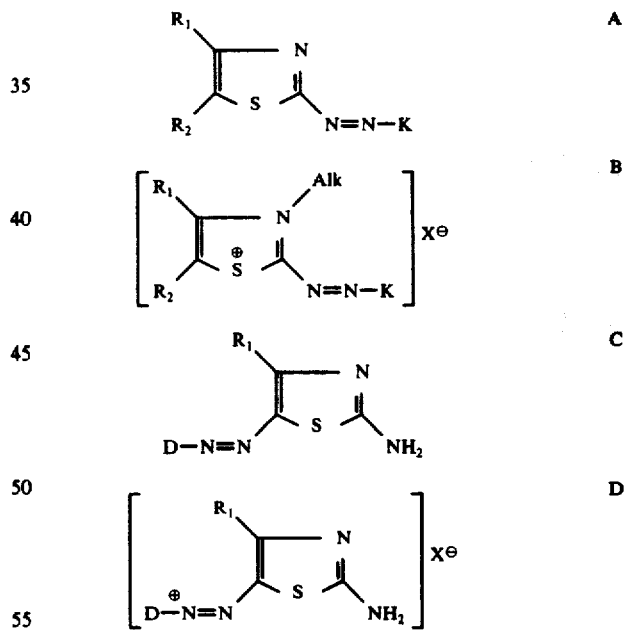

may be prepared, wherein $R_1$ and $R_2$ have the above meaning, K is the radical of a coupling component, D the radical of a diazo component, Alk is a lower alkyl radical and $X^\ominus$ is an anion usual in cationic dyestuffs.

The thiazolazo compounds of the formula A and C obtained according to the invention are very suitable, if they are free from sulfonic acid groups, for the dyeing and printing of synthetic fibres, for example from polyacrylonitrile or mixed polymers of the acrylonitrile with other vinyl compounds, as for example acrylic esters, acrylamides, vinyl pyridine, vinyl chloride or vinylidene chloride, or from mixed polymers of dicyanoethylene and vinyl acetate, as well as of acrylonitrile-block mixed polymers, fibres of polyurethanes, polypropylene, cellulosetri- and -2½-acetate and especially fibres of polyamides, such as polyamide-6, polyamide-6,6 or polyamide-12 and of aromatic polyesters, for example of terephthalic acid and ethylene glycol or 1,4-dimethylolcyclohexane, and mixed polymers of terephthalic and isophthalic acid and ethylene glycol. If the compounds of the formula A and C contain watersolubilizing groups, as for example sulfonic acid groups, they are suitable for dyeing wool and polyamide fibres.

The compounds of the formulae B and D are suitable for dyeing or printing tanned cellulose fibres, silk, leather or fully synthetic fibres, such as acetate silk, polyamide fibres or acidically modified polyamide or polyester fibres, especially of fibres containing polyacrylonitrile or polyvinylidene cyanide. The dyeings obtained on these fibres are mostly very intense and generally have a good fastness to light and to wetting, for example a good fastness to washing, fulling, cross-dyeing, carbonizing chlorine and perspiration, as well as a good fastness to decatizing, steaming, ironing, rubbing and to solvents.

The thiazolazo compounds of the formula A, wherein K represents the radical of a diaminopyridine may also be used as bactericides, for example in the form of the watersoluble salts thereof. Especially interesting for the preparation according to the invention are thiazolazo compounds corresponding to the general formulae

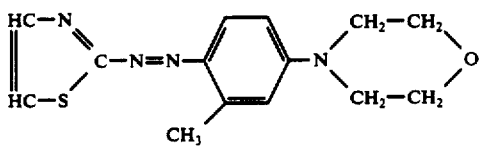

wherein $R_1$ is hydrogen, methyl, phenyl or ethoxycarbonylmethyl, $R_2$ is hydrogen, a carboxylic acid methyl ester or carboxylic acid ethyl ester radical or the acetyl radical, Alk is lower alkyl having 1 to 5 carbon atoms, preferably 1 to 2 carbon atoms and $X^{\ominus}$ is an anion usual in cationic dyestuffs and K is a radical of the formula

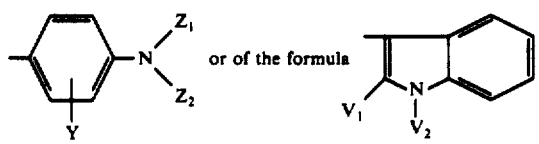

wherein Y stands for hydrogen, chlorine or the methyl group, $Z_1$ are identical or different and each of them is hydrogen, an alkoxy radical having 1 to 4 carbon atoms, the β-cyanoethyl, β-hydroxyethyl, benzyl or phenethyl radical, $V_1$ is methyl or phenyl and $V_2$ is hydrogen or methyl.

The following Examples illustrate the invention. Parts and percentages are by weight unless stated otherwise.

EXAMPLE 1 a. 22,8 Parts of thiourea were introduced into 120 parts by volume of glacial acetic acid. At 40°-50° C 52.3 parts of a 45% aqueous chloroacetaldehyde solution were added dropwise to this suspension, stirring was continued for 2 hours at 40°-50° C and the whole was cooled to 0° C. Into this solution containing 2-amino-thiazole 72 parts of a 42.3% nitrosyl-sulfuric acid were introduced at 0° to 5° C, while stirring well, stirring was continued for 30 – 60 minutes with a constant excess of nitrile, and subsequently the excess of nitrite was destroyed with amidosulfonic acid. At 0° to 20° C a solution of 53 parts of 3-methyl-phenylmorpholine in 60 parts by volume of glacial acetic acid was introduced into the yellow clear diazo solution, stirring was continued for 1 hour at 25° C, and the reaction batch was poured onto 1500 parts of ice water. The pH-water was adjusted to 3 with aqueous sodium hydroxide solution. The precipitated crystalline dyestuff was suction-filtered and washed well with water. After drying at 60° C, 66 parts of dyestuff of the formula

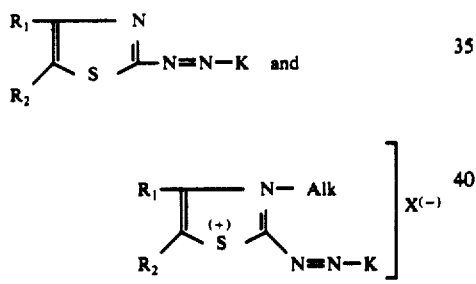

was obtained, which is suitable for dyeing polyesters.

b. 29 Parts of this dyestuff were dehydrated azeotropically with 300 parts by volume of toluene, then clarified with charcoal and kieselguhr. The filtrate was mixed with one part of magnesium oxide. While stirring, a solution consisting of 10 parts by volume of dimethyl sulfate and 25 parts by volume of toluene were added dropwise at 80°- 90° C. Stirring was continued for about 7 hours until the quarternation was finished at 80°-90° C. The crystalline dyestuff was suction-filtered and washed well with toluene.

After drying 39 parts of dyestuff of the formula

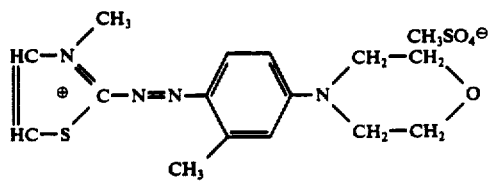

were obtained which dyed acid modified polyacrylnitrile fibres in brilliant violet shades having excellent coloristical fastness properties.

c. Instead of the chloroacetaldehyde used in the preparation of the 2-amino-thiazole there may also be used equivalent amounts of bromoacetaldehyde, chloroacetaldehyde-dimethyl- or diethyl acetal, bromoacetaldehyde-dimethyl- or diethyl acetal, acetic acid-α,β-dichloro- or dibromoethyl ester, bis-(α,β-dichloro- or dibromo-ethyl)- ether, α,β-dichloro-ethyl- or α,β-dibromo-ethyl- or -butyl or -isoamyl ether or propionic acid-dichloro- or dibromoethyl ester.

EXAMPLE 2 a. 9.1 Parts of thiourea were introduced into 60 parts by volume of glacial acetic acid. To this suspension 32.8 parts of a 45% aqueous bromoacetaldehyde solution were added dropwise at 40°-50° C. Stirring was continued for 2 hours at about 50° C, then for 12 hours at room temperature and then the whole was cooled to 0° C the solution was diazotized with 30 parts of a 42.3% nitrosylsulfuric acid, and the reaction mixture was stirred for 30 minutes with an excess of nitrile. The excess of nitrite was destroyed with amidosulfonic acid. The diazo solution obtained was added dropwise to 200 parts by volume of ice water and 16 parts of N-methyl-N-cyanoethylamino-benzene, and stirring was continued for 1 hour at 20°-25° C, whereby the sulfate of the dyestuff was partly precipitated. The whole was diluted with 1000 parts by volume of water and the pH was adjusted to 4 by adding dropwise an aqueous sodium hydroxide solution. The crystalline dyestuff base was suction-filtered and washed free from salt with water. After drying at 60° C 22 parts of dyestuff of the formula

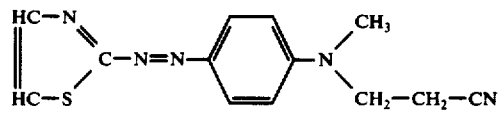

20°-25° C and stirring was continued for 30 minutes at 20°-25° C. With cooling from the outside and maintaining the temperature at about 25° C 160 parts by volume of water were added dropwise. The sulfate of the dyestuff was precipitated and suction-filtered after stirring for 2 hours.

b. For quarternation the moist filter cake was suspended in 95 parts by volume of water and adjusted to pH 9.5 with 3 parts of magnesium oxide. After adding further 7 parts of magnesium oxide, quarternation was carried out while slightly cooling from the outside, with 45 parts by volume of dimethylsulfate, within 1 hour at about 30° C and then stirring was continued for 3 hours at 30° C. To destroy the residual amounts of dimethyl sulfate 4 parts by volume of an aqueous ammonia solution of about 25% by weight were added, and stirring was continued again for 30 minutes at 30° C; subsequently the whole was diluted with 500 parts by volume of water and pH was adjusted to 1.7 with sulfuric acid. The sulfate of the dyestuff was separated in a crystalline form. After stirring for 3 hours it was suction-filtered quickly. After drying at 60° C 56 parts of the dyestuff of the formula

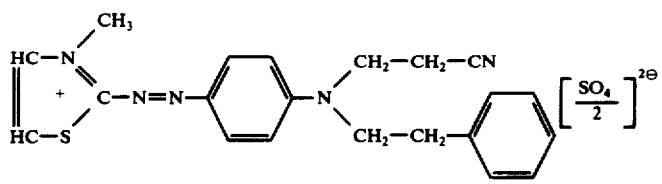

were obtained.

b. 13.5 Parts of this dyestuff were dehydrated azeotropically with 300 parts of chlorobenzene. After addition of one part of MgO a solution of 5 parts by volume of dimethyl sulfate were added dropwise at about 40° C to 25 parts by volume of chlorobenzene, the whole was stirred for 1 hour at 40° C and for 7 hours at 80°-90° C until the dyestuff was completely quarternated, and the crystalline dyestuff was suction-filtered. It was washed well with chlorobenzene. After drying at 60° C 16 parts of dyestuff of the formula

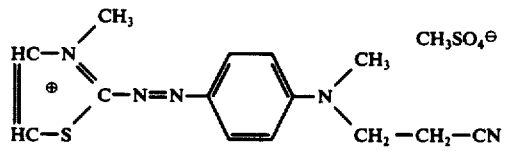

were obtained which dyed acid modified polyacrylonitrile fibres in brilliant violet shades having good fastness properties.

EXAMPLE 3 a. 15.2 Parts of thiourea were suspended in 80 parts by volume of glacial acetic acid. At about 50° C 35 parts of a 35 % chloroacetaldehyde were introduced dropwise, and the whole was stirred for 2 hours at 50° C. At 0° to 5° C it was diazotized with 46 parts of a 42.3% nitrosylsulfuric acid, stirring of the reaction mixture was continued for 30 minutes at 5° C and the excess of nitrite was destroyed with amidosulfonic acid. A solution of 38 parts of N-cyanoethyl-N-phenethyl aniline in 180 parts of a 40 % sulfuric acid were added dropwise to this diazo solution. Then the temperature was increased to were obtained. The dyestuff dyed acid modified polyacrylonitrile fibres in violet shades having very good coloristical properties.

EXAMPLE 4 a. 15.2 Parts of thiourea were suspended in 60 parts by volume of glacial acetic and 20 parts by volume of water. At 25° C, 18.5 parts of chlorocetone were introduced dropwise. The temperature increased to about 60°-65° C. The reaction mixture was refluxed for 2 hours, cooled to 0° C and mixed with 10 parts by volume of a 95 % sulfuric acid. At 0° to 5° C 60 parts of a 42.3 % nitrosylsulfuric acid were introduced dropwise. Stirring of the diazo solution was continued for 30 minutes and added at 10° to 20° C to a fine suspension of 41 parts of dibenzyl aniline in 300 parts by volume of glacial acetic acid and 400 parts by volume of water; stirring was continued for 1 hour at 20°-25° C, the whole was diluted with 2000 parts by volume of ice water, and the pH was adjusted to 3 to 4 with aqueous sodium hydroxide solution. The dyestuff obtained was suction-filtered and washed with water. After drying 44 parts of the dyestuff of the formula

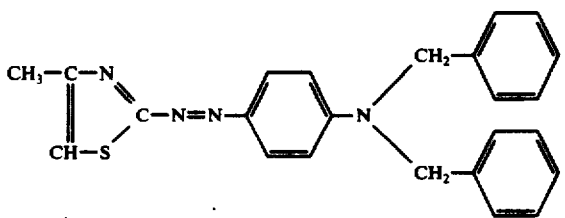

were obtained.

b. 40 Parts of this dyestuff may be quarternized, as described in Example 1, to the dyestuff of the following formula

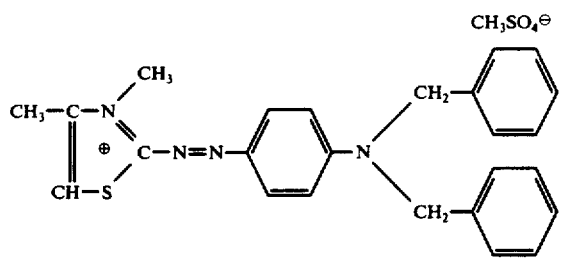

The dyestuff obtained dyed acid modified polyacrylonitrile fibres in reddish blue shades having very good coloristical properties.

EXAMPLE 5

If in Example 4 instead of the chloroacetone the equivalent amount of ω-chloro- or bromoacetophenone was used, the dyestuff of the formula

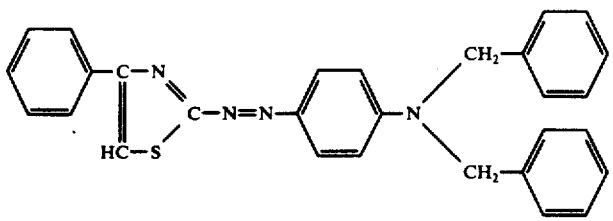

was obtained.

EXAMPLE 6

9.1 Parts of thiourea were suspended in 36,5 parts by volume of glacial acetic acid. At 40° - 50° C 19.8 parts of ω-chloroacetacetic acid ethyl ester were introduced dropwise, the whole was stirred for 2 hours at 40° - 50° C and cooled to 20° C; subsequently 5 parts by volume of a 95 % sulfuric acid and 10 parts by volume of water were successively added at 20° - 25° C. This mixture was cooled to 0° C and diazotized at 0° - 5° C by dropwise addition of 26 parts of a 42.3% nitrosylsulfuric acid. Stirring was continued for 30 minutes, the excess of nitrite was destroyed with amidosulfonic acid and a solution of 16 parts of 3-chlorophenyl morpholine in 50 parts by volume of glacial acetic acid were introduced dropwise into the diazo solution at 5° - 15° C. Stirring was continued for 1 hour at 20° - 25° C, the mixture was poured onto 1000 parts by volume of ice water, and the pH-value was adjusted to 5 with an aqueous sodium hydroxide solution. The dyestuff was extracted with 500 parts by volume of chlorobenzene. From the chlorobenzene dyestuff solution, the water was removed azetropically and the dyestuff was quarternized, as described in Example 2 with 10 parts by volume of dimethyl sulfate. 25 Parts of the dyestuff of the formula

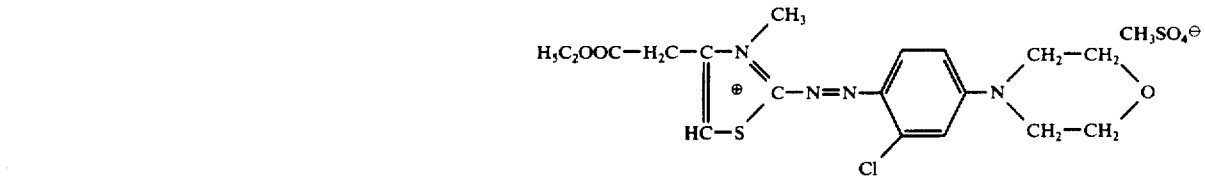

was obtained which dyed acid modified polyacrylonitrile fibres in reddish blue shades having very good coloristical properties, and fastness.

EXAMPLE 7

18.2 Parts of thiourea were suspended in 75 parts by volume of glacial acetic acid. At 40° - 50° C, 42 parts of a 45% chloroacetaldehyde solution were added dropwise, the mixture was stirred for 2 hours at 40° - 50° C, then stirring was continued at room temperature for 12 hours. At 0° - 5° C it was diazotized with 60 parts of a 42.3% nitrosylsulfuric acid, stirring was continued for 30 minutes at 0° - 5° C and the excess of nitrite was destroyed with amidosulfonic acid. The diazo solution thus prepared was introduced into a solution of 14.4 parts of 2-hydroxy-naphthalene in 50 parts by volume of dimethylformamide. Then it was diluted with 1000 parts by volume of ice water, and the pH was adjusted to 4. Stirring was continued for 1 hour, the dyestuff was suction-filtered and washed with water. After drying 23 parts of the dyestuff of the formula

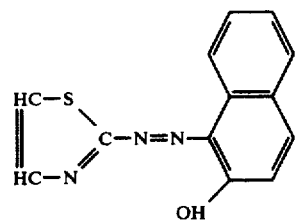

were obtained, which was suitable for dyeing polyester fibres and for preparing metal complex dyestuffs.

EXAMPLE 8

The preparation and diazotation of the 2-aminothiazole was carried out in analogy to Example 7. At 20°-25° C the diazo solution was introduced into a solution of 60.5 parts of 2-hydroxy-naphthalene-3-carboxylic acid-(2'-ethoxy)-anilide in 500 parts by volume of dimethylformamide, stirring was continued for 30 minutes, the whole was diluted with 3000 parts by volume of water, and the pH value was adjusted to 4 to 5 with an aqueous sodium hydroxide solution. The dyestuff precipitated in a crystalline form, was suction-filtered and washed well with water. After drying 80 parts of a dyestuff of the formula

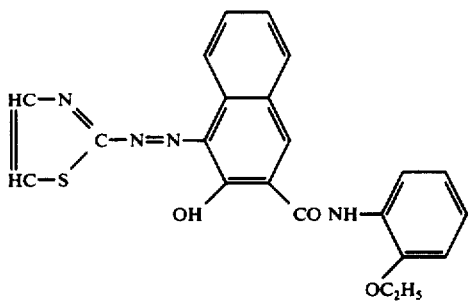

were obtained.

EXAMPLE 9

The preparation and diazotation of 2-amino-thiazole was carried out in analogy to Example 3.

At 0°-10° C, a solution of 20.7 parts of 1-methyl-2-phenylindole in 60 parts by volume of dimethylformamide was introduced dropwise into the diazo solution, the mixture was stirred for 30 minutes at 10° - 15° C and the coupling mixture was poured into 1000 parts by volume of ice water which was adjusted to a pH of 4 to 5 with an aqueous sodium hydroxide solution. The dyestuff obtained in a crystalline form was suction-filtered and washed with water.

After drying, 30 parts of dyestuff of the formula

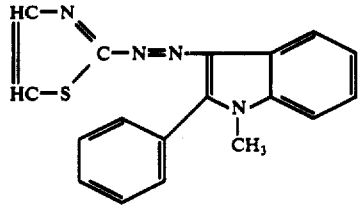

were obtained which could be quarternized, in the manner as described in Example 2, whereby about 31 parts of the dyestuff of the formula

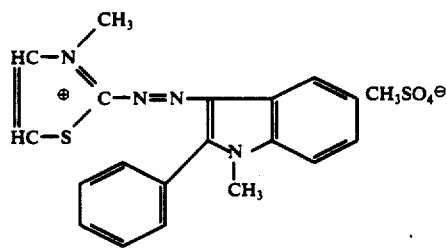

were obtained, which dyed acid modified polyacrylonitrile fibres in brilliant red shades having very good coloristical properties.

EXAMPLE 10

The preparation and diazotation of 2-amino-thiazole was carried out in analogy to Example 7.

The diazo solution was introduced into a solution of 56 parts of N-ethyl-N-phenylaminoethane-sulfonic acid in 400 parts by volume of water. The very brown red dyed coupling solution was adjusted to an alkaline medium with an aqueous sodium hydroxide solution and then stirring was continued for some minutes. The dyestuff of the formula

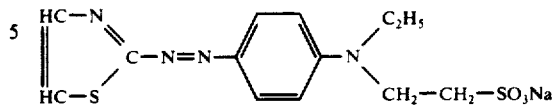

was suction-filtered and washed with an aqueous sodium chloride solution. It dyed wool from an acidic dyebath in red brown shades.

EXAMPLE 11

18.2 Parts of thiourea were suspended in 75 parts by volume of glacial acetic acid. At 40° - 50° C 42 parts of a 45% chloroacetaldehyde solution were added dropwise, stirring was continued for 2 hours at 40° - 50° C, and the mixture was cooled to room temperature. A diazo solution prepared in known manner, of 27.6 parts of 4-nitroaniline was added dropwise to this solution at 10° - 20° C. A pH - value of 4 was adjusted by means of an aqueous sodium carbonate or sodium hydroxide solution whereby coupling was initiated. Stirring was continued for 30 minutes, the dyestuff was suction-filtered and dried. 64 Parts of the dyestuff of the formula

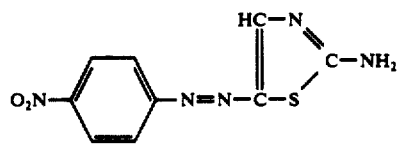

were obtained.

EXAMPLE 12

The preparation and diazotation of 2-amino-thiazole was carried out in analogy to Example 3. The diazo solution was introduced at 0° - 10° C into 7.3 parts of 5-amino-1-methylpyrazole in 200 parts by volume of ice water, stirring was continued for one hour at 10° - 15° C and then the whole was neutralized with sodium hydroxide solution. The dyestuff obtained in a crystalline form was suction-filtered and washed well with water. After drying 17 parts of the dyestuff of the formula

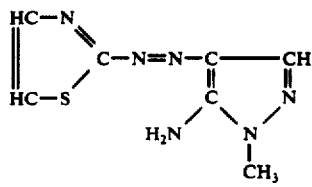

was obtained, which was quarternized as described in Example 2, yielding a dyestuff of the formula

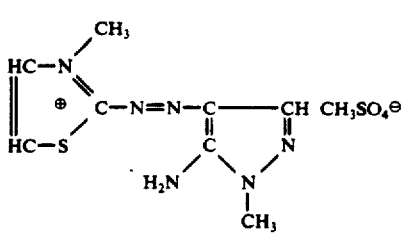

This quarternary dyestuff dyed acid modified polyacrylonitrile fibres in brilliant golden yellow shades having very good coloristical properties.

EXAMPLE 13 a. 9.1 Parts of thiourea were suspended in 36.5 parts by volume of glacial acetic acid. Within one hour, at 40° - 50° C, 19.8 parts of α-chloroacetacetic acid ethal ester were added dropwise, stirring was continued for 2 hours at 50° - 60° C, and the whole was cooled to 20° C. At 20° - 25° C, with cooling from the outside, 10 parts by volume of a 95% sulfuric acid and 10 parts by volume of water were successively introduced dropwise. The mixture obtained was cooled to 0° C and diazotized at 0° - 5° C with 26 parts of a 42.3% nitrosylsulfuric acid. Stirring was continued for 30 minutes with a constant excess of nitrosyl-sulfuric acid which was then destroyed with amidosulfonic acid. The diazo solution thus obtained was added slowly at 0° - 10° C to 15.2 parts of N-ethyl-N-β-cyanoethyl aniline in 200 parts by volume of ice water. Stirring of the reaction mixture was continued for 30 minutes, the mixture was diluted with 1000 parts by volume of ice water, and the pH-value was adjusted to 4-5 with an aqueous sodium hydroxide solution. The dyestuff precipitated was suction-filtered and dried at 60° C. 27 Parts of the dyestuffs of the formula

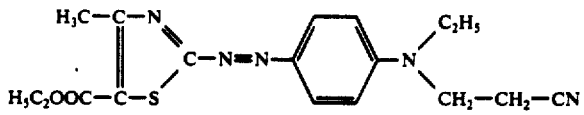

were obtained.

b. 27 Parts of this dyestuff were heated to the boil in 500 parts by volume of chlorobenzene and clarified with charcoal and kieselguhr. The filtrate was mixed with 1 part of magnesium oxide. While stirring, a solution of 10 parts by volume of dimethylsulfate in 25 parts by volume of chlorobenzene were added dropwise at about 40° C, and stirring was continued for 1 hour at 40° C and then for 5 hours at 80°-90° C. The dyestuff obtained was suction-filtered, washed with chlorobenzene and dried at 60° C. 28 Parts of the dyestuff of the formula

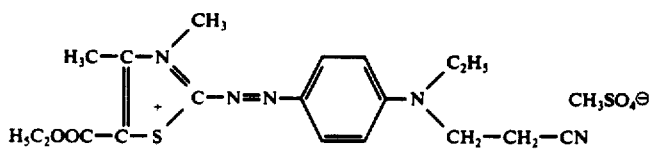

were obtained which dyed acid modified polyacrylonitrile fibres in brilliant violet shades and had excellent properties.

EXAMPLE 14

If instead of the α-chloroacetacetic acid ethyl ester used in Example 13 equivalent amounts of α-chloroacetacetic acid methyl ester were used, the analogous dyestuff of the formula

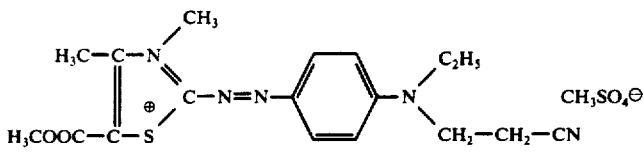

was obtained after diazotation, coupling and subsequent quarternation, which dyed also acid modified polyacrylonitrile fibres in violet shades having very good coloristical properties.

EXAMPLE 15

If instead of the α-chloroacetacetic acid ethyl ester used in Example 13 equivalent amounts of α-chlorobenzoylaceticacid ethyl ester were used, the dyestuff of the formula

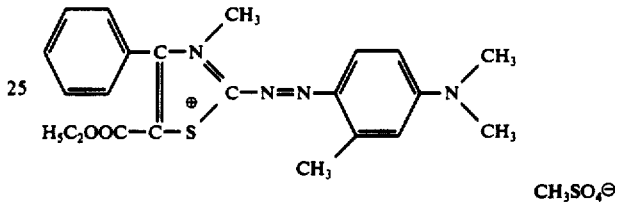

was obtained after diazotation, coupling with 3-N,N-diethylaminotoluene and subsequent quarternation with dimethylsulfate in chlorobenzenic solution, which dyestuff dyed acid modified polyacrylonitrile fibres in reddish blue shades having very good coloristical properties.

EXAMPLE 16

If instead of the α-chloroacetacetic acid ethyl ester used in Example 13 equivalent amounts of 3-chloro-propandion-(2.4) were used, the dyestuff of the formula

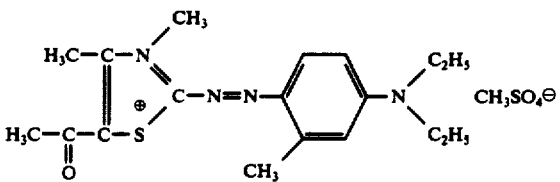

was obtained after diazotation, coupling with 3-N-N-diethylamino-toluene and subsequent quarternation with dimethylsulfate in chlorobenzenic solution, which dyestuff dyed acid modified polyacrylonitrile fibres in blue shades having very good coloristical properties.

EXAMPLE 17 a. 36.5 Parts of thio-urea were introduced into 180 parts of water. At 75° – 80° C, 84 parts of a 45% aqueous chloroacetaldehyde solution were added dropwise, stirring was continued for 2 hours at 75°–80° C, the mixture was cooled to 20° C, and 120 parts by volume of a 95% sulfuric acid were added at 20° C with external cooling.

The solution containing 2-amino-thiazole-sulfate was cooled to +5° C, mixed with 180 parts of ice, so that the temperature decreased to −10° C. In the temperature range of −10° C to +5° C, 90 parts by volume of a 5-N-sodium nitrite solution were introduced quickly and stirring was continued for 15 minutes. Then the diazo solution was added to a mixture of 3200 parts of ice water, 78.8 parts of N-methyl-N-benzyl-aniline and 2 parts of amidosulfonic acid, stirring of the dyestuff suspension thus obtained was continued for one hour and the dyestuffs base was isolated by adjusting this suspension with an aqueous sodium hydroxide solution to a pH-value of 1.5.

The dyestuff was suction-filtered, washed with water and dried at 60° C. 120 Parts of a dyestuff of the formula

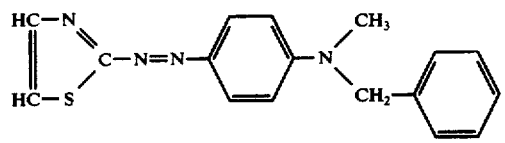

was obtained which dyed polyester in red shades.

b. 77 Parts of this dyestuff were dissolved with boiling in 670 parts by volume of chlorobenzene; this solution was clarified at about 80° C with charcoal and kieselguhr, and the filtrate was mixed with 0.12 part of magnesium oxide. At 40° – 50° C 28.6 parts by volume of dimethylsulfate were added dropwise, while stirring, the mixture was heated within 2 hours to 80° C, and stirring was continued for 6 hours at 80° - 90° C. After cooling to 40° C the crystalline dyestuff was suction-filtered. It was washed with chlorobenzene and dried at 60° C. 102 Parts of the dyestuff of the formula

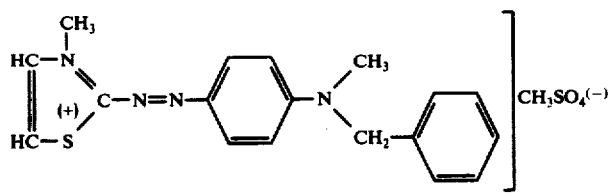

were obtained which dyed acid modified polyacrylonitrile fibres in brilliant violet shades having excellent tinctorial fastness properties.

EXAMPLE 18

120 Parts by volume of a 95% sulfuric acid were added while stirring within 15 to 30 minutes to 360 minutes to 360 parts by volume of water. 36.5 Parts of thio-urea were introduced into the 36% sulfuric acid thus prepared of about 70° C, whereby the whole cooled to 60° C. The resulting solution was heated to 75° C; then, at 75°–80° C, 83,8 parts of a 45% chloroacetaldehyde solution were added dropwise, stirring was continued at about 80° C for 2 hours and then the whole was cooled to 0° C. In the temperature range of 0° to 5° C 92 parts by volume of a 5N sodium nitrite solution were introduced dropwise as fast as possible and stirring was continued for 10 minutes.

At 10° C a solution of 42.8 parts of 3-amino-toluene in 200 parts by volume of glacial acetic acid was introduced dropwise into the diazo solution thus obtained, stirring was continued for 1 hour at 10° – 15° C; subsequently the mixture was poured onto 4000 parts by volume of ice water. Part of the acid was neutralized with 450 parts by volume of a 33% sodium hydroxide solution, stirring was continued for one hour at room temperature and then the crystalline dyestuff was suction-filtered.

After drying at 60° C 67 parts of the dyestuff of the formula

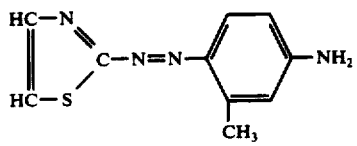

were obtained which were dissolved hot in 1500 parts by volume of chlorobenzene and clarified with charcoal and kieselguhr. After filtering, the filtrate was mixed with 0.1 part of magnesium oxide. To this solution 45 parts by volume of dimethylsulfate were added at 40°–50° C, then the mixture was heated within 2 hours to 90° C, and stirring was continued for 6 hours at this temperature. Then the mixture was cooled to 30° C and the crystalline dyestuff was suction-filtered. It was washed thoroughly with chlorobenzene, and the crystallized product was dried at 60° C.

80 Parts of the dyestuff of the formula

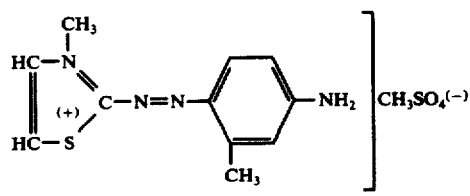

were obtained which dyed acid modified polyacrylonitrile fibres in brilliant bordo shades.

EXAMPLES 19 to 23

The dyestuffs listed in the following Table were prepared and may be prepared also with a high purity in similar way as described in the previous Examples. They dye, for example, polyacrylonitrile fibres in clear and brilliant shades.

| Example | Dyestuff | | Shade of the polyacrylonitrile dyeing |
|---|---|---|---|
| 19 | ![structure] N=N—⟨aryl with CH₃⟩—NHCH₂CH₂CN | CH₃SO₄⁻ | bluish bordo |
| 20 | ![structure] N=N—⟨aryl with Cl⟩—NHCH₂CH₂CN | CH₃SO₄⁻ | bordo |
| 21 | ![structure] N=N—⟨indole with CH₃, N-CH₃⟩ | CH₃SO₄⁻ | red |
| 22 | ![structure] N=N—⟨2-phenylindole NH⟩ | CH₃SO₄⁻ | red |
| 23 | ![structure] N=N—⟨aryl⟩—N(C₂H₅)CH₂CH₂OH | CH₃SO₄⁻ | violet |

We claim:

1. In a process for the preparation of a pure thiazolazo compound wherein a 2-aminothiazole is used as a diazo component which comprises diazotizing a synthetized 2-aminothiazole and coupling it with a coupling component to yield the azo compound, the improvement consisting of using the 2-aminothiazole in the diazotization process directly after its synthesis without intermediate isolation from its preparation reaction mixture.

2. A process as claimed in claim 1, wherein the aminothiazole compound has the formula

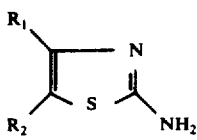

wherein R₁ is hydrogen, alkyl of 1 to 5 carbon atoms, aralkyl, aryl, trifluoromethyl, cyano, carboxyl, carboxylic acid ester, carboxylic acid amide, carboxylic acid hydrazide, carbalkoxyalkyl, carbamoylalkyl or a heterocyclic radical and R₂ is hydrogen, hydroxyalkyl, alkyl of 1 to 5 carbon atoms, aryl, carboxy, carboxylic acid ester, carboxylic acid amide, alkylsulfonyl of 1 to 5 carbon atoms, or arylsulfonyl, wherein the carboxylic acid amide group may contain substituents.

3. Process as claimed in claim 1, wherein a compound of the formula

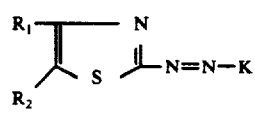

is obtained, wherein R₁ is hydrogen, methyl, phenyl or ethoxycarbonylmethyl, R₂ is hydrogen, carboxylic acid methyl ester, carboxylic acid ethyl ester radical or acetyl and K is

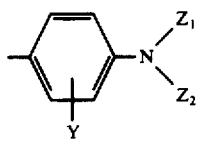
or
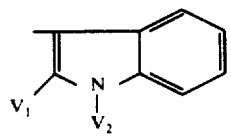
wherein Y is hydrogen, chlorine or methyl, $Z_1$ and $Z_2$ are identical or different and each is hydrogen, alkyl of 1 to 4 carbon atoms, β-cyanoethyl, β-hydroxyethyl, benzyl or phenethyl, $V_1$ is methyl or phenyl and $V_2$ is hydrogen or methyl.
* * * * *